United States Patent [19]

Ahn

[11] Patent Number: 4,884,153

[45] Date of Patent: Nov. 28, 1989

[54] SINGLE DRIVING SYSTEM FOR TAPE LOADING AND REEL MODE CONVERSION OF VCR

[75] Inventor: Hee K. Ahn, Suwon, Rep. of Korea

[73] Assignee: Samsung Electronics Co., Ltd, Rep. of Korea

[21] Appl. No.: 48,823

[22] Filed: May 12, 1987

[30] Foreign Application Priority Data

May 14, 1986 [KR] Rep. of Korea ............. 1986-3741

[51] Int. Cl.⁴ .................... G11B 15/61; G11B 5/008
[52] U.S. Cl. ........................................ 360/85; 360/95
[58] Field of Search ........... 360/85, 95, 130.21–130.24

[56] References Cited

U.S. PATENT DOCUMENTS

| | | | |
|---|---|---|---|
| 4,491,885 | 1/1985 | Morikawa et al. | 360/85 |
| 4,492,994 | 1/1985 | Suda et al. | 360/85 |
| 4,562,496 | 12/1985 | Saito et al. | 360/85 |
| 4,611,251 | 9/1986 | Yokoo | 360/85 |
| 4,661,864 | 4/1987 | Kuwajima | 360/85 |

FOREIGN PATENT DOCUMENTS

| | | |
|---|---|---|
| 0597921A2 | 8/1982 | European Pat. Off. . |
| 0105501A2 | 4/1984 | European Pat. Off. . |
| 0200459 | 11/1983 | Japan ................ 360/85 |
| 2105510A | 3/1983 | United Kingdom . |

Primary Examiner—Stuart N. Hecker
Assistant Examiner—David J. Severin
Attorney, Agent, or Firm—Saidman, Sterne Kessler & Goldstein

[57] ABSTRACT

A single driving system for both tape loading and operational mode conversion of video cassette recorder is disclosed. The system comprises a single drive motor, a drive gear and a selective power transmission system which are engaged successively and made to be used in a VCR provided with conventional tape loading ring gear and reel mode converting means. The selective power transmission device may comprise a sun gear, one or two planet gears, a gear for tape loading movement, a gear for reel mode converting movement and a means to control and select the movement of latter two gears.

6 Claims, 3 Drawing Sheets

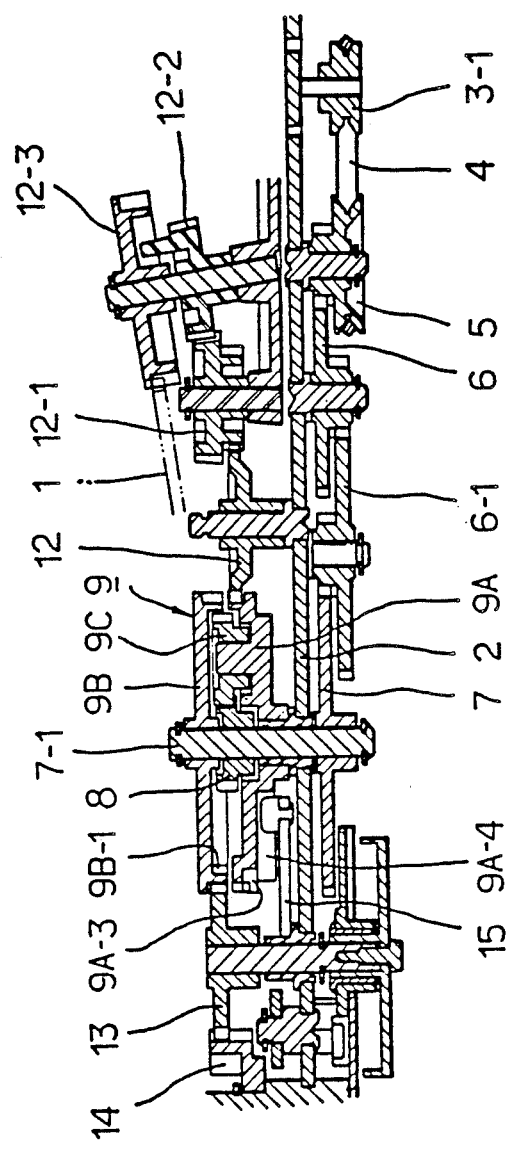

SINGLE DRIVING SYSTEM FOR TAPE LOADING AND REEL MODE CONVERSION OF VCR

BACKGROUND OF THE INVENTION

The present invention relates to a single driving system for tape loading and reel mode conversion of video cassette recorder, more particularly to a drive system in which a single motor is employed to drive and control the operation of tape loading and reel mode conversion for VCR.

The conventional VCR employs two separate motors, one for loading a tape from a cassette placed in a predetermined position onto a tape path which may include a head drum and manipulating a subloading lever and the other for driving a cam gear that actuates a cam plate to convert operating modes according to the selection of the user.

The employment of two motors in the conventional VCR makes the VCR expensive and uneconomical. Besides, the consequential separate power transmission systems naturally require more components and processes in manufacturing the VCR set and result in not only more complexity but also greater size and weight of the unit to adversely affect to the current trend of compact VCRs.

SUMMARY OF THE INVENTION

An object of the present invention is to provide a novel and simple motor drive system for tape loading and reel mode conversion of VCR.

Another and more specific object of the present invention is to provide a system which can control both the loading of a tape and the conversion or reel modes by employing a single motor in order to get rid of the abovementioned disadvantages in the conventional VCR.

Still another object of the invention is to simplify the construction of the control system for loading a tape and converting reel modes and to reduce the number of parts to bring down the production cost by means of employing a single motor and a suitable power transmission device.

To achieve the aforementioned objects, the invention is so constructed that the driving force from a single motor is, by means of a selective power transmission device, discriminatingly transmitted to either a tape loading ring gear or a cam plate for converting reel modes.

BRIEF DESCRIPTION OF DRAWINGS

A preferred embodiment of the present invention will be described in detail with reference to the accompanying drawings wherein like members bear like numerals and wherein;

FIG. 2 is a section view of the embodiment in FIG. 1.

FIGS. 3(a) and 3(b) show views of the operational engagements of the selective power transmission device by this invention, in which FIG. 3(a) illustrates how the driving force of the drive motor is transferred to the cam plate which converts the reel modes, and FIG. 3(b) illustrates how the driving force of the drive motor is transmitted to the tape loading ring gear.

DETAILED DESCRIPTION OF THE INVENTION

In the accompanying drawings, only the essential mechanical components are shown, as the remaining components are evident to a person skilled in the art.

According to a preferred embodiment of the invention shown by way of non-limiting example being used in a VCR using the U loading method, an idle pulley being engaged with the shaft of a drive motor by means of a belt is further linked to several interlocking gears to transmit the driving force to a drive gear, from which several gears of selective power transmission device are independently supported on the same shaft in a stacked state. The power transmission device engages selectively and subsequently either with the tape loading ring gear which performs tape loading or with the cam plate which converts reel modes such as Play, Record, Fast Forward, Rewind or Forward Picture Search, thus enabling a single motor to control two stage operations that used to require two separate motors for the operation of subloading lever and loading ring gear and for the change of reel modes.

Figure 1:
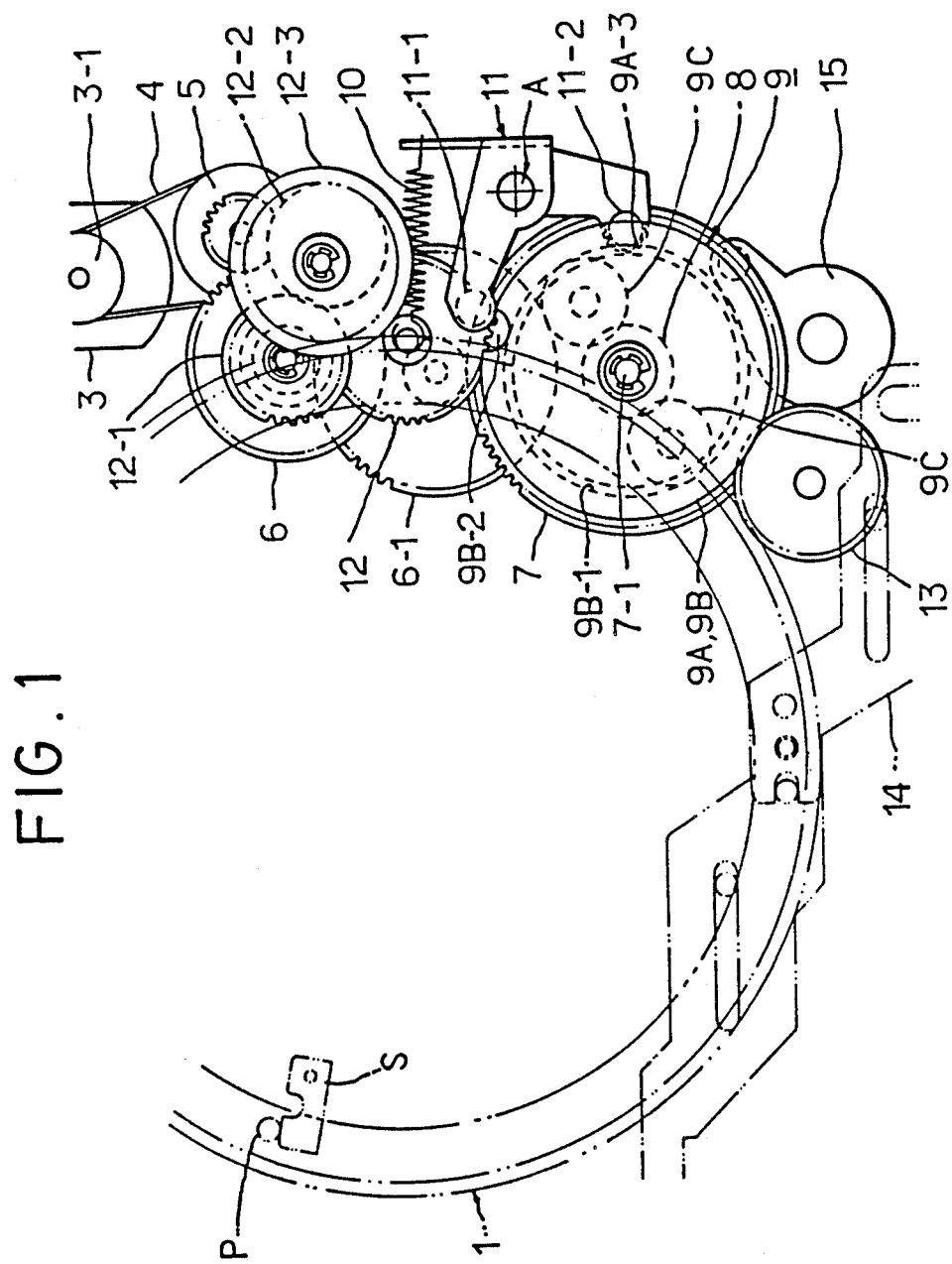
FIG. 1 is a general plan view of an embodiment of the invention.
Figure 3A:
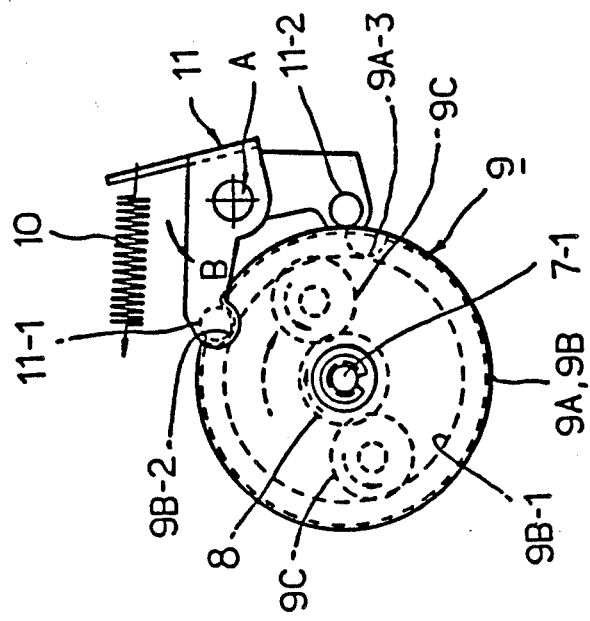
Figure 3B:
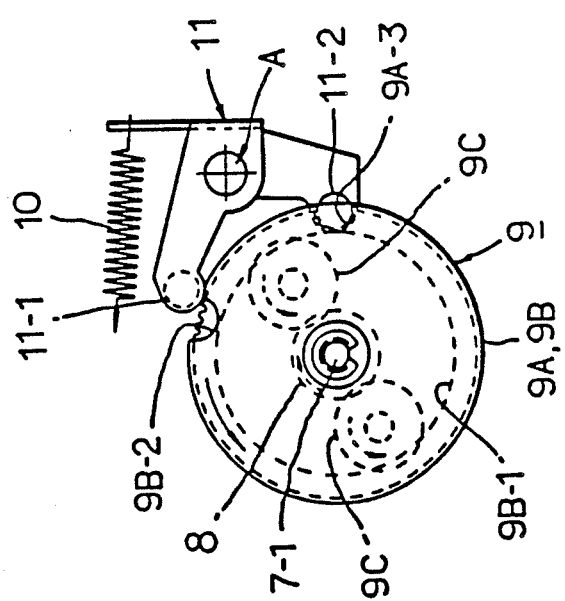

As shown in FIG. 1 and FIG. 2, a loading ring gear 1 for loading the tape onto a tape path is rotatably mounted on a deck 2 which is also provided with a drive motor 3 on the other side. The shaft of the motor 3 is provided with a pulley 3-1 being engaged with an idle pulley 5 by means of a belt 4 for a unitary rotation with each other. The pulley 5 is arranged to engage with interlocking gears 6 and 6-1 in succession and transmits the driving force of the motor 3 to a driving gear 7, which has a sun gear 8 mounted on its shaft 7-1. The sun gear 8 is engaged with planet gears 9C revolving around it. Planet gears 9C are engaged with a lower transmission gear 9A at their axes and also with an upper transmission gear 9B by means of internal gear teeth 9B-1. Thus, the driving gear 7, the sun gear 8, the lower and upper transmission gears 9A and 9B, planet gears 9C and a control lever 11 constitute a selective power transmission device 9. The upper gear 9B and the lower gear 9A of the selective power transmission device 9 are provided with half-round grooves 9A-3 and 9B-2 on their rims to receive the corresponding locking pins 11-1 and 11-2 which are mounted on each tip of the arms of the control lever 11. The control lever 11 is axially supported by its shaft A and urged in the direction of arrow B in FIG. 3(b) by the tension of a tension spring 10. When the control lever 11 locks one of the transmission gears 9B and 9A, by means of the locking pin 11-1 or 11-2 inserted in the groove 9B-2 or 9A-3, respectively, the other is in unlocked state to be rotated by the driving force of the drive motor 3.

The lower transmission gear 9A of the device 9 is arranged to engage with interlocking gears 12, 12-1, 12-2, 12-3 in succession to deliver the driving force to the loading ring gear 1, and on the bottom side thereof is provided with a cam member 9A-4 to actuate the subloading lever 15. The upper transmission gear 9B is arranged to engage with an interlocking gear 13 to transmit the driving force to and manipulate a cam plate 14 for converting the reel modes according to the user's order.

Now, a detailed description will be given on the operation of the above embodiment by this invention.

When a tape cassette is inserted into a cassette holder (not shown) and two reels of the cassette are respectively fitted to two reel discs (not shown) on the deck 2 and one of the switches is turned on by the user to operate VCR in such a way as wanted, the drive motor 3 starts to rotate as designed. The driving force of the drive motor 3 is transmitted through pulleys 3-1 and 5 and interlocking gears 6 and 6-1 to the drive gear 7, making its shaft 7-1 rotate together with the sun gear 8 fixed on it and the sun gear 8 in turn rotates planet gears 9C being engaged with it.

Meanwhile, the locking pin 11-1 of the control lever 11 which is axially supported on the shaft A is engaged with the groove 9B-2 of the upper transmission gear 9B and the other locking pin 11-2 is in a position apart from the groove 9A-3 of the lower transmission gear 9A to leave the gear 9A free from locking. Consequently, the upper gear 9B is locked by the interaction of the locking pin 11-1 and the groove 9B-2 and the planet gears 9C, being engaged with the sun gear 8 and also with the internal gear teeth 9B-1, revolve around the sun gear 8. Revolution of the planet gears 9C causes the lower gear 9A to rotate. The lower gear 9A in turn rotates the interlocking gears 12, 12-1, 12-2 and 12-3 successively and the driving force of the motor 3 is eventually transmitted to the loading ring gear 1 to start tape loading movement.

Before the tape is being loaded in a conventional way by rotation of the lower gear 9A and the loading ring gear 1, the cam member 9A-4, provided on the bottom side of the lower gear 9A actuates the subloading lever 15 so that two guide pins (not shown) may pull out the tape from the cassette and push it outwardly. As tape loading operation is completed, a projection P provided on the ring gear 1 makes contact with the stopper S and interrupts the rotation of the ring gear 1.

On completion of tape loading, the groove 9A-3 of the lower gear 9A comes to the position under the locking pin 11-2 with the driving force still delivered to the lower gear 9A. However, the driving force, as the ring gear 1 is unable to rotate as described hereinbefore, is also unable to rotate the lower transmission gear 9A being meshed with the ring gear 1 and the rotating power of the planet gears 9C is inevitably shifted toward and applied to the upper transmission gear 9B. When the rotating force applied by the planet gears 9C to the upper transmission gear 9B, whose rotation has been interrupted by the locking pin 11-1 positioned in its groove 9B-2 due to the action of the tension spring 10, becomes greater than the tension of the spring 10, the gear 9B pushes the locking pin 11-1 out of the groove 9B-2 and starts to rotate. As the pin 11-1 comes out of the groove 9B-2, the lever 11 rotates in clockwise direction and the locking pin 11-2 is inserted into the groove 9A-3, locking the lower transmission gear 9A. As such, the lower gear 9A is prevented from rotating and the planet gears 9C begin to transmit the rotating force from the sun gear 8 through the internal gear teeth 9B-1 to the upper transmission gear 9B, whose rotation in turn actuates the cam plate 14 which is made to convert the reel modes. The cam plate 14 performs its mode converting function in a common way as selected among various modes such as Play, Record, Rewind, Fast Forward and Forward Picture Search by the user.

According to the invention, as the user turns on a switch in order to operate VCR, the drive motor is set in motion to carry out tape loading operation by the loading ring gear. Upon completion of the tape loading, the driving force of the drive motor is shifted to the cam plate 14 from the loading ring gear to do the mode converting function. Accordingly, the operation for tape loading and reel mode conversion is carried out continuously and without interruption by a single drive motor. On manipulation of the stop switch of VCR, operation of VCR pursuant to the selected mode is suspended and then VCR is operated in reverse order in comparison with the order for tape loading and reel mode conversion until the tape is unloaded.

As can be seen from the above, a single drive motor is able to actuate the loading ring gear 1 and also the cam plate 14 for converting reel modes by the present invention.

In the above-described embodiment of this invention, other mechanisms, for instance, chains and sprockets or films or endless wires or the like, can be adopted instead of using belt 4, idle pulley 5, interlocking gears 6, 6-1, 12, 12-1, 12-2 and 12-3, and further the numbers or the sizes of the interlocking gears 6 and 6-1, or 12, 12-1, 12-2 and 12-3 can be changed according to the speed of the drive motor and/or the size of VCR.

In addition, a single planet gear can be used instead of two and the interlocking gear can be replaced by other appropriate mechanisms.

The simple construction of the system by the present invention facilitates production of VCR at a low cost and contributes much to manufacturing more compact VCRs.

Although the present invention has been described with respect to a preferred embodiment constructed in accordance therewith for the purpose of illustrating the manner in which the invention may be used to advantage, it will be apparent to those skilled in the art that various variations, modifications, equivalent arrangements or improvements may be made without departing from the scope and spirit of the invention.

Accordingly, it will be appreciated that the invention is not to be limited by the specific embodiment herein, but only by the scope of the appended claims.

What is claimed is:

1. A single driving system for tape loading and reel mode conversion of a VCR including a head drum, a ring gear for tape loading and reel mode converting means, said single driving system comprising:

a single drive motor to perform the functions of tape loading and reel mode conversion;

a drive gear being rotated by the driving force of said drive motor transmitted through a first interlocking means;

a selective power transmission device which transmits successfully and discriminatingly the driving force of said drive motor, transferred from said drive gear, to said ring gear and said reel mode converting means through a second interlocking means under the control of a single control lever;

said power transmission device including:

a sun gear, having at least one planet gear connectively engaged with said sun gear such that said sun gear and said planet gear rotate in opposite directions, a gear for tape loading, said ring gear being responsive to said gear for tape loading;

a gear for reel mode conversion, said reel mode converting means being responsive to said gear for reel mode conversion;

said gear for tape loading, said gear for reel mode conversion, and said sun gear being connectively engaged at a common axis; and said gears for tape loading and reel mode conversion having a groove on their respective rims to receive a locking pin of said control lever, whereby when said locking pin is received by said groove of one of said gears, the driving force of said driving motor is transferred to that gear whose groove has not received said locking pin.

2. A single drive system as claimed in claim 1 in which said control lever is axially supported and urged to be rotated by tension of a tension spring.

3. A single driving system as claimed in claim 2 in which said first interlocking means between said drive motor and said drive gear comprises:
- a belt, said belt being attached at a first portion to a pulley, said pulley being connectively engaged to said motor;
- an idle pulley, to which a second portion of said belt is attached; and
- at least two interlocking gears, connectively attached at a first end to said idle pulley, and at a second end to said drive gear.

4. A single driving system as claimed in claim 2 in which said second interlocking means between said selective power transmission device and said ring gear comprises at least one gear responsive to said power transmission device, and said ring gear responsive to said at least one gear.

5. A single driving system as claimed in claim 2 in which said second interlocking means between said selective power transmission device and said reel mode converting means comprises at least one gear, said reel mode converting means comprising a cam plate, said at least one gear responsive to said power transmission device, and said cam plate responsive to said at least one gear.

6. A single driving system as claimed in claim 2 in which said sun gear is fixed on the same shaft together with said drive gear, and said gear for reel mode conversion has internal gear teeth to mesh with exterior gear teeth of said planet gear.

* * * * *